US011342089B2

(12) United States Patent
Hosokawa et al.

(10) Patent No.: US 11,342,089 B2
(45) Date of Patent: May 24, 2022

(54) PREDICTIVE MODEL CONSTRUCTION AND PREDICTION METHOD FOR RADIOACTIVE METAL CORROSION CONCENTRATION IN NUCLEAR REACTOR WATER

(71) Applicant: Hitachi-GE Nuclear Energy, Ltd., Hitachi (JP)

(72) Inventors: Hideyuki Hosokawa, Tokyo (JP); Tsuyoshi Ito, Tokyo (JP); Hiroko Sukeda, Tokyo (JP); Mayu Sasaki, Ibaraki (JP); Naoshi Usui, Ibaraki (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 243 days.

(21) Appl. No.: 17/024,208

(22) Filed: Sep. 17, 2020

(65) Prior Publication Data
US 2021/0098142 A1 Apr. 1, 2021

(30) Foreign Application Priority Data

Sep. 20, 2019 (JP) .............................. JP2019-172262

(51) Int. Cl.
*G21D 3/00* (2006.01)
*G06N 20/00* (2019.01)
(Continued)

(52) U.S. Cl.
CPC ............. *G21D 3/001* (2013.01); *G06N 20/00* (2019.01); *G21C 17/10* (2013.01); *G21D 3/10* (2013.01);
(Continued)

(58) Field of Classification Search
CPC ..... G21C 15/28; G21C 17/10; G21C 17/0225; G21C 1/02; G21D 3/001; Y02E 30/00;
(Continued)

(56) References Cited

U.S. PATENT DOCUMENTS 5,133,901 A * 7/1992 Peterson ................. G01N 23/12
  209/3.2
2003/0063702 A1 * 4/2003 Kruger ................. G21C 17/022
  376/260

(Continued)

FOREIGN PATENT DOCUMENTS

JP 64-63894 A 3/1989
JP 6-289179 A 10/1994
JP 2008008750 A * 1/2008 ............. G21C 17/02

*Primary Examiner* — Darlene M Ritchie
(74) *Attorney, Agent, or Firm* — Crowell & Moring LLP (57) ABSTRACT

A reactor water radioactivity concentration of a nuclear power plant can be predicted with high accuracy. First, a plant state quantity prediction value is calculated by using a physical model that describes plant state quantities of the power plant including a flow rate of feedwater and a metal corrosion product concentration in feedwater of the reactor water is calculated. Next, data for supervised learning is created, and the data for supervised learning includes the previously calculated plant state quantity prediction value and a plant state quantity such as the flow rate of feedwater, the metal corrosion product concentration in feedwater, a metal corrosion product concentration in reactor water, and a radioactive metal corrosion concentration of the reactor water in the reactor as input data and includes a radioactive metal corrosion concentration in the reactor water which is an actual measured value as output data, and a predictive model is trained.

8 Claims, 8 Drawing Sheets

(51) Int. Cl.
*G21C 17/10* (2006.01)
*G21D 3/10* (2006.01)
G21C 15/28 (2006.01)
G21C 1/02 (2006.01)
G21C 1/08 (2006.01)
G21C 5/12 (2006.01)
G21C 17/022 (2006.01)

(52) U.S. Cl.
CPC ............... *G21C 1/02* (2013.01); *G21C 1/084* (2013.01); *G21C 5/12* (2013.01); *G21C 15/28* (2013.01); *G21C 17/0225* (2013.01)

(58) Field of Classification Search
CPC .... Y02E 30/30; G06K 9/6256; G06K 9/6271; G06N 20/00; G06N 3/08
See application file for complete search history.

(56) References Cited

U.S. PATENT DOCUMENTS

| | | | | |
|---|---|---|---|---|
| 2007/0055392 | A1* | 3/2007 | D'Amato | G05B 13/048 700/44 |
| 2020/0338639 | A1* | 10/2020 | Friesth | H01M 8/04014 |
| 2020/0387653 | A1* | 12/2020 | Pivovar | G06F 30/27 |
| 2021/0027901 | A1* | 1/2021 | Henry | G21C 7/36 |
| 2021/0074442 | A1* | 3/2021 | Hoover | G06N 3/08 |

* cited by examiner

PREDICTIVE MODEL CONSTRUCTION AND PREDICTION METHOD FOR RADIOACTIVE METAL CORROSION CONCENTRATION IN NUCLEAR REACTOR WATER

CROSS REFERENCE TO RELATED APPLICATION

This application claims priority under 35 U.S.C. § 119 from Japanese Patent Application No. 2019-172262, filed Sep. 20, 2019, the entire disclosure of which is herein expressly incorporated by reference.

BACKGROUND OF THE INVENTION

1. Field of the Invention

The present invention relates to a predictive model construction method and prediction method of a reactor water radioactivity concentration of a nuclear power plant.

2. Description of the Related Art

For example, a boiling water nuclear power plant and a pressurized water nuclear power plant are known as nuclear power plants (also simply referred to as plants). In the plants, for a main constituent member such as a reactor pressure vessel, stainless steel, nickel base alloy, or the like is used in a water contact portion that is configured to contact water in order to inhibit corrosion. Further, in the plants, a part of cooling water (hereinafter, also referred to as reactor water) existing in the reactor pressure vessel is cleaned up by a reactor water cleanup system, and metal impurities exist in a small amount in the reactor water are actively removed.

Even if corrosion prevention measures are taken as described above, an existence of a very small amount of metal impurities remaining in the reactor water is unavoidable, and therefore a part of the metal impurities adhere to, as metal oxides, outer surfaces of fuel rods included in a fuel assembly. Irradiation of neutrons emitted from nuclear fuel materials in the fuel rods cause nuclear reactions of metal elements contained in the metal impurities adhered to the outer surfaces of the fuel rods, and the metal elements are turned into radionuclides such as cobalt 60, cobalt 58, chromium 51, and manganese 54. A part of the radionuclides adhered to the outer surfaces of the fuel rods in forms of oxides are eluted as ions in the reactor water in accordance with solubility of the oxides in which the radionuclides are incorporated. The radionuclides are re-emitted into the reactor water as insoluble particles, which are referred to as claddings.

A part of the radionuclides in the reactor water is removed by the reactor water cleanup system. However, radionuclides that are not removed are accumulated on surfaces of structure members that contact the reactor water while circulating in a reactor water recirculation system or the like together with the reactor water. As a result, radiation is emitted from the surfaces of the structure members, causing radiation exposure of a person who performs a periodic inspection. An exposure dose of the person is managed so as not to exceed a prescribed value for each person. However, in recent years, the prescribed value has been lowered, causing a necessity to economically reduce the exposure dose of each person as much as possible.

In such a situation, it is an effective measure to predict the exposure dose at a time of a next periodic inspection, to make a shielding plan or a work personnel plan and to determine necessity of decontamination besides lowering a total exposure dose. In order to predict the exposure dose, it is necessary to predict a pipe dose, and since the pipe dose is strongly dependent on the reactor water radioactivity concentration during operation, it is important to predict a transition of the reactor water radioactivity concentration during an operation period of the plant. In addition, since the exposure dose of the next periodic inspection is predicted and used for a periodic inspection plan, it is necessary to perform the prediction as fast as possible.

As a prediction method of the reactor water radioactivity concentration, for example, there is a water quality diagnostic system for reducing a dose rate of a primary reactor cooling water system using a physical and chemical simulation model as described in JP-A-64-063894 (PTL 1). The water quality diagnostic system predicts a future plant dose rate by using a simulation model (mass balance model) for estimating a change in radioactivity in the cooling water with a current water quality condition as an input, and diagnoses the current water quality condition based on a result of the prediction. In a technique of PTL 1, it is necessary for the simulation model and model parameters to be already existed and optimized. However, in reality, the model parameters change temporally, and as the operation continues, a machine or a material may be replaced and a difference between a model calculation value and an actual measured value may increase.

A self-learning diagnosis and prediction device described in JP-A-06-289179 (PTL 2) has a function of automatically repairing model parameters in response to a temporal change such as a specification and a characteristic of a plant, so as to prevent degradation of prediction accuracy and improve a model by self-learning.

In a technique described in PTL 2, optimization and contribution of model parameters of a model set based on a physical model or a chemical model are adjusted, and it is necessary to prepare the model in advance. Therefore, it is necessary to describe, as a mathematical expression, a correlation between a state quantity of a prediction target and a state quantity used as input.

The correlation of the state quantities represented by a mass balance model is optimized by optimizing the model parameters. However, although the correlation is considered, an appropriate model cannot be constructed when the correlation is complicated and it is difficult to represent the correlation by a mathematical expression. Therefore, it is required to accurately predict the state quantity of the plant even when a correlation is complicated and cannot be represented by a mathematical expression.

SUMMARY OF THE INVENTION

The invention was made in view of such a background, and an object of the invention is to provide a highly accurate predictive model construction method and prediction method of a reactor water radioactivity concentration of a nuclear power plant.

In order to solve the above problems, the predictive model construction method is a predictive model construction method of a reactor water radioactivity concentration predictive model construction device that predicts a radioactive metal corrosion product concentration in reactor water of a nuclear reactor in a nuclear power plant, and the predictive model construction method includes: the predictive model construction device executing a step of calculating a plant state quantity prediction value to be calculated by using a physical model that describes plant state quantities of the nuclear power plant including a flow rate of feedwater and a metal corrosion product concentration in feedwater of the reactor water in the nuclear reactor, and a step of causing a machine learning model to learn learning data for supervised learning so as to construct a predictive model, and the learning data for supervised learning includes the plant state quantity prediction value and a plant state quantity that is able to be actually measured and includes at least one of the flow rate of feedwater, the metal corrosion product concentration in feedwater, a metal corrosion product concentration in reactor water, a radioactive metal corrosion product concentration in reactor water, a flow rate of reactor water cleanup system, duration of stay in reactor core in a fuel assembly, and electrical output of the reactor water in the nuclear reactor as input data and includes a radioactive metal corrosion product concentration in the reactor water which is an actual measured value as output data.

In order to solve the above problems, the prediction method is a prediction method of a reactor water radioactivity concentration prediction device that predicts a radioactive metal corrosion product concentration in reactor water of a nuclear reactor in a nuclear power plant, the prediction device stores a predictive model that is obtained by causing a machine learning model to learn learning data for supervised learning, the learning data for supervised learning includes a plant state quantity that is able to be actually measured and includes at least one of a flow rate of feedwater, a metal corrosion product concentration in feedwater, a metal corrosion product concentration in reactor water, a radioactive metal corrosion product concentration in reactor water, a flow rate of reactor water cleanup system, duration of stay in reactor core in a fuel assembly, and electrical output of the reactor water in the nuclear reactor and a plant state quantity prediction value calculated by using a physical model that describes plant state quantities of the nuclear power plant including the flow rate of feedwater and the metal corrosion product concentration in feedwater of the reactor water in the nuclear reactor as input data and includes a radioactive metal corrosion product concentration in the reactor water which is an actual measured value as output data, and the prediction method includes the prediction device executing a step of calculating the plant state quantity prediction value based on the plant state quantities by using the physical model, and a step of inputting the calculated plant state quantity prediction value and a plant state quantity that includes at least one of the flow rate of feedwater, the metal corrosion product concentration in feedwater, the metal corrosion product concentration in reactor water, the radioactive metal corrosion product concentration in reactor water, the flow rate of reactor water cleanup system, the duration of stay in reactor core in the fuel assembly, and the electrical output of the reactor water in the nuclear reactor into the predictive model as input data and calculating a radioactive metal corrosion product concentration in the reactor water as output data.

According to the invention, it is possible to provide a highly accurate predictive model construction method and prediction method of the reactor water radioactivity concentration of the nuclear power plant.

DESCRIPTION OF THE PREFERRED EMBODIMENTS

A nuclear power plant to be predicted and a simulation model (mass balance model) for estimating a change in radioactivity in reactor water will be described before a reactor water radioactivity concentration prediction device in an embodiment for carrying out the invention is described.

<Overview of Nuclear Power Plant>

Figure 1:
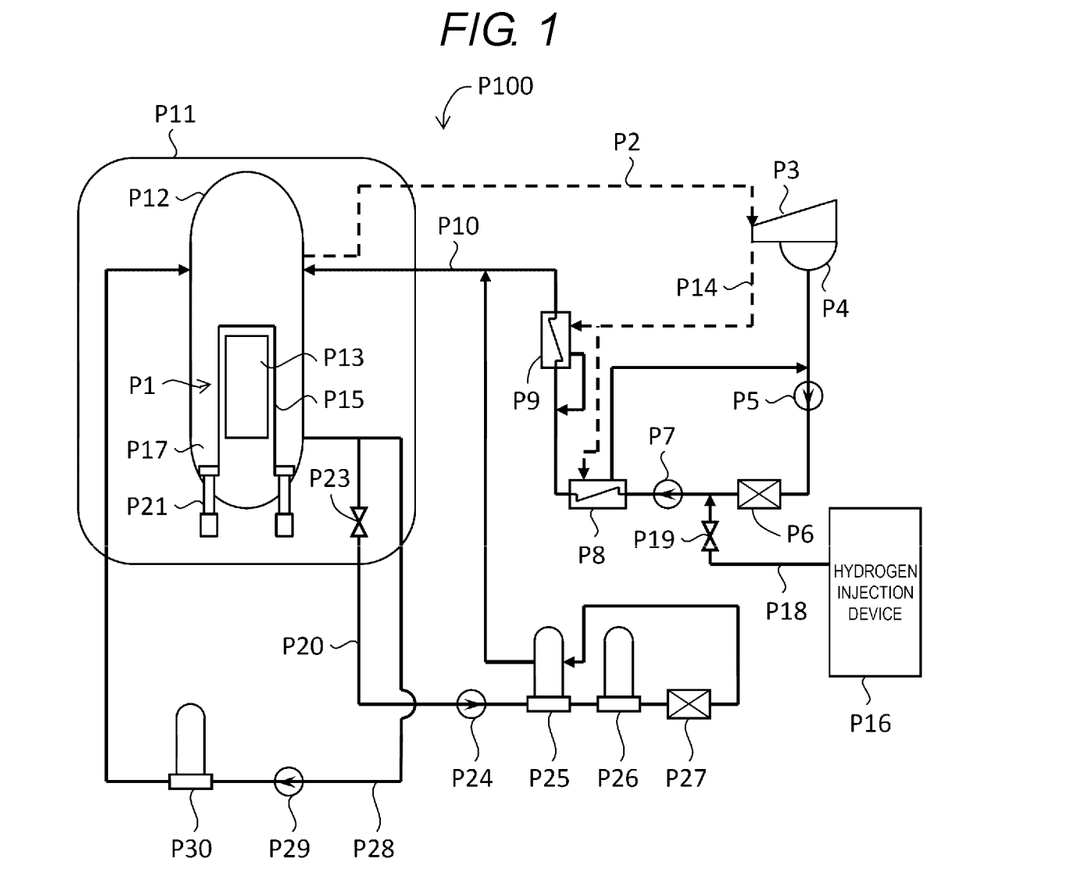
FIG. 1 is an overall system configuration diagram of a nuclear power plant according to a present embodiment.

FIG. 1 is an overall system configuration diagram of a nuclear power plant P100 according to the present embodiment. A schematic configuration of the nuclear power plant P100 (for example, a boiling water nuclear power plant) to which the reactor water radioactivity concentration prediction device according to the present embodiment is applied will be described with reference to FIG. 1.

The nuclear power plant P100 includes a nuclear reactor P1, a turbine P3, a condensate water device P4, a nuclear reactor cleanup system, and a feedwater system. The nuclear reactor P1 installed in a nuclear reactor storage vessel P11 includes a reactor pressure vessel P12 with a reactor core P13 built in. A cylindrical reactor core shroud P15 installed in the reactor pressure vessel P12 surrounds the reactor core P13. A plurality of fuel assemblies (not shown) are loaded in the reactor core P13. Each fuel assembly includes a plurality of fuel rods filled with a plurality of fuel pellets produced from a nuclear fuel material. An annular downcomer P17 is formed between an inner surface of the reactor pressure vessel P12 and an outer surface of the reactor core shroud P15. A plurality of internal pumps P21 are installed at a bottom of the reactor pressure vessel P12. Impellers of the internal pumps P21 are disposed below the downcomer P17.

The feedwater system includes a condensate water pump P5, a condensate water cleanup device P6, a feedwater pump P7, a low pressure feedwater heater P8, and a high pressure feedwater heater P9 installed in this order from the condensate water device P4 toward the reactor pressure vessel P12 in a feedwater pipe P10 connecting the condensate water device P4 and the reactor pressure vessel P12. A hydrogen injection device P16 is connected to the feedwater pipe P10 between the condensate water cleanup device P6 and the feedwater pump P7 by a hydrogen injection pipe P18. An on-off valve P19 is provided on the hydrogen injection pipe P18.

The nuclear reactor cleanup system includes a cleanup system isolation valve P23, a cleanup system pump P24, a regenerative heat exchanger P25, a non-regenerative heat exchanger P26, and a reactor water cleanup system P27 installed in this order in a stainless steel cleanup system pipe (stainless steel member) P20 connecting the reactor pressure vessel P12 and the feedwater pipe P10. A residual heat removal system provided in the nuclear power plant P 100 includes a residual heat removal system pipe P28 whose one end portion is connected to the reactor pressure vessel P12 and is connected to the downcomer P17, and whose another end portion is connected to an inside of the reactor pressure vessel P12 and is above the reactor core P13. A residual heat removal system pump P29 and a heat exchanger (cooling device) P30 are installed in the residual heat removal system pipe P28. One end of the cleanup system pipe P20 is connected to the residual heat removal system pipe P28 upstream of the residual heat removal system pump P29.

Cooling water (reactor water) existing in the downcomer P17 in the reactor pressure vessel P12 is pressurized by the internal pumps P21 and guided to a lower plenum below the reactor core P13. The reactor water is supplied from the lower plenum to the reactor core P13, and is heated by heat generated by fission of the nuclear fuel material contained in the fuel rods of the fuel assembly. A part of the heated reactor water is turned into steam. The steam is guided from the reactor pressure vessel P12 through a main steam pipe P2 to the turbine P3 to rotate the turbine P3. A power generator (not shown) connected to the turbine P3 is rotated to generate electric power. The steam discharged from the turbine P3 is condensated by the condensate water device P4 and is turned into water.

The water is supplied as feedwater into the reactor pressure vessel P12 through the feedwater pipe P10. The feedwater flowing through the feedwater pipe P10 is pressurized by the condensate water pump P5, impurities are removed by the condensate water cleanup device P6, the water is further pressurized by the feedwater pump P7, and heated by the low pressure feedwater heater P8 and the high pressure feedwater heater P9. Extraction steam extracted from the main steam pipe P2 and the turbine P3 at an extraction pipe P14 is supplied to the low pressure feedwater heater P8 and the high pressure feedwater heater P9 respectively, and serves as a heating source of the feedwater.

A certain percentage of the reactor water is cleaned up by a reactor water cleanup system since the reactor water in the reactor pressure vessel P12 contains a metal corrosion product contained in the feedwater and a product generated by corrosion of structural material inside the reactor pressure vessel P12. The reactor water in the reactor pressure vessel P12 is supplied to the regenerative heat exchanger P25 and the non-regenerative heat exchanger P26 through the cleanup system pipe P20 branched from the residual heat removal system pipe P28 by driving of the cleanup system pump P24, and is cooled to about 50° C. by the heat exchangers. After the metal corrosion product contained in the reactor water is removed by allowing the cooled reactor water to pass through the reactor water cleanup system P27, and the reactor water is heated by the regenerative heat exchanger P25, the heated reactor water merges with the feedwater flowing in the feedwater pipe P10 and is supplied to the reactor pressure vessel P12.

All control rods (not shown) are inserted into the reactor core when the operation of the nuclear reactor P1 is stopped. The fission reaction of the nuclear fuel material is stopped due to the insertion of all the control rods, and the operation of the nuclear reactor P1 is stopped. Although residual heat in the reactor core P13 and in machines in the reactor pressure vessel P12 is removed by evaporation of the reactor water, the reactor core P13 and the machines in the reactor pressure vessel P12 are cooled by using the residual heat removal system when a temperature of the reactor water drops to about 150° C., since efficiency of heat removal by evaporation of the reactor water decreases when the temperature drops to some extent. That is, the reactor water in the reactor pressure vessel P12 is supplied to the heat exchanger P30 through the residual heat removal system pipe P28 under driving of the residual heat removal system pump P29, and then the reactor water is cooled by the heat exchanger P30 and returned to the reactor pressure vessel P12.

The reactor water during operation of the nuclear reactor contains a radioactive metal corrosion product, including cobalt 60, causing adherence to the structural material in accordance with the concentration thereof, and causing radiation exposure of a person who performs periodic inspection due to radiation from radionuclides adhering to the structural material.

According to the reactor water radioactivity concentration prediction device according to the present embodiment, a radioactive metal corrosion product concentration can be predicted with high accuracy. By using the prediction, an operator of the plant can design a plan to inhibit the exposure by reducing the reactor water radioactivity concentration during operation, laying a shield, or performing chemical decontamination.

<Overview of Mass Balance Model>

Figure 2:
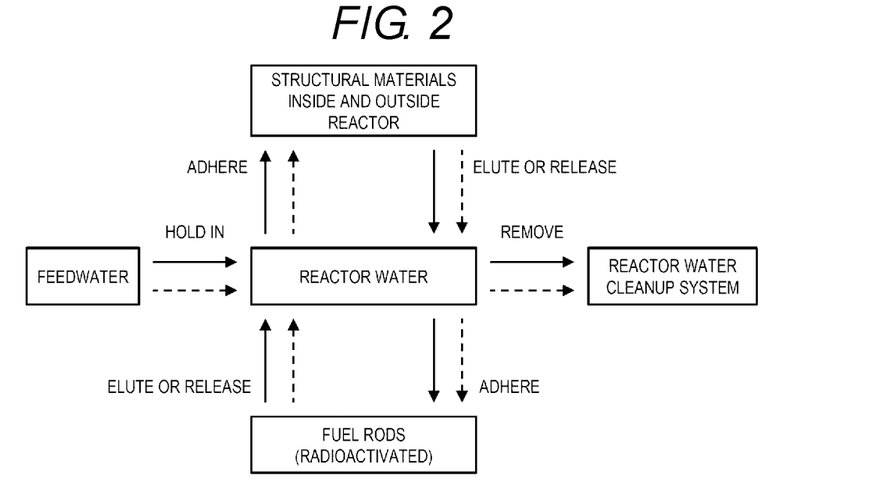
FIG. 2 is a diagram showing a mass balance model of a migration behavior of a metal corrosion product to reactor water according to the present embodiment.

FIG. 2 is a diagram showing a mass balance model 140 (see FIG. 3 described later) of a migration behavior of a metal corrosion product to the reactor water according to the present embodiment. The mass balance model 140 is a physical model that describes, according to the macro mass conservation law, dynamic behaviors of allowing a metal corrosion product contained in the feedwater and a metal corrosion product generated due to corrosion of structural materials inside and outside the reactor in contact with the reactor water to be re-adhered to surfaces of the fuel rods or surfaces of the structural materials inside and outside the reactor where the reactor water is interposed, and removing the metal corrosion products out of the system by the reactor water cleanup system. The solid line arrow and the dashed line arrow in FIG. 2 indicate migration by cladding and ions.

The mass balance model 140 of the metal corrosion product is described by a group of simultaneous differential equations shown in Equations 1 to 8 below.

$$\frac{dC}{dt} = \frac{1}{V}\{F_f C_f + X + \zeta M + \zeta_p^1 m_1 + \zeta_p^2 m_2 - (\delta V + \beta V + \delta_p^1 S_1 + \delta_p^2 S_2)C\} \quad \text{(Equation 1)}$$

$$\frac{dM}{dt} = \delta VC - \zeta M \quad \text{(Equation 2)}$$

$$\frac{dm_1}{dt} = \delta_p^1 S_1 C - \zeta_p^1 m_1 \quad \text{(Equation 3)}$$

$$\frac{dm_2}{dt} = \delta_p^2 S_2 C - \zeta_p^2 m_2 \quad \text{(Equation 4)}$$

$$\frac{dR}{dr} = \frac{1}{V}\{Y + \zeta A + \zeta_p^1 \Gamma_1 + \zeta_p^2 \Gamma_2 - (\delta V + \beta V + \delta_p^1 S_1 + \delta_p^2 S_2 + \lambda)R\} \quad \text{(Equation 5)}$$

$$\frac{dA}{dt} = GM + \delta RV - (\zeta + \lambda)A \quad \text{(Equation 6)}$$

$$\frac{d\Gamma_1}{dt} = G_1 m_1 + \delta_p^1 S_1 R - (\zeta_p^1 + \lambda)A \quad \text{(Equation 7)}$$

$$\frac{d\Gamma_2}{df} = \delta_p^2 S_2 R - (\zeta_p^2 + \lambda)A \quad \text{(Equation 8)}$$

In the above equations, meanings of variables and parameters are as follows.

C: metal corrosion product concentration in reactor water (concentration of, for example, iron, nickel, cobalt, and the like)

t: time point

V: retention amount of reactor water $F_f$: flow rate of feedwater $C_f$: metal corrosion product concentration in feedwater X: generation rate of metal corrosion product generated by corrosion of in-reactor structural materials $\zeta$: elution or release constant of fuel rod adhesive substances $\zeta_p^1$: elution or release constant of in-reactor structural material adhesive substances $\zeta_p^2$: elution or release constant of out-reactor structural material adhesive substances M: amount of metal corrosion product accumulated on fuel rods $m_1$: amount of metal corrosion product adhered to and accumulated on surfaces of in-reactor structural materials $m_2$: amount of metal corrosion product adhered to and accumulated on surfaces of out-reactor structural materials $\delta$: adhesive constant for fuel rods $\beta$: removal rate in nuclear reactor cleanup system $\delta_p^1$: adhesive constant for in-reactor structural materials $\delta_p^2$: adhesive constant for out-reactor structural materials $S_1$: surface area of in-reactor structural materials $S_2$: surface area of out-reactor structural materials R: radioactive metal corrosion product concentration in reactor water (concentration of, for example, cobalt 60, cobalt 58, manganese 54, and the like)

Y: generation rate of radioactive metal corrosion product generated by corrosion of in-reactor structural materials A: amount of radioactive metal corrosion product accumulated on fuel rods $\Gamma_1$: amount of radioactive metal corrosion product adhered to and accumulated on surfaces of in-reactor structural materials $\Gamma_2$: amount of radioactive metal corrosion product adhered to and accumulated on surfaces of out-reactor structural materials $\lambda$: decay constant of radioactive metal corrosion product G: production rate of radionuclides on fuel rods $G_1$: production rate of radionuclides on in-reactor structural materials Among the above variables, C, $C_f$, $F_f$, R, and $\Gamma_2$ are state quantities that can be measured during operation, and M, A, and $\Gamma_1$ are state quantities that can be measured when the fuel rods are taken out from the inside of the reactor at a time of stopping of periodic inspection and the like. V, $S_1$, and $S_2$ are plant parameters unique to the plant. $\lambda$, G, and $G_1$ are physical constants determined in accordance with nuclides of the radioactive metal corrosion product, and X, Y, $\zeta$, $\zeta_p^1$, $\zeta_p^2$, $\delta$, $\delta_p^1$, $\delta_p^2$, and $\beta$ are model parameters in principle. $m_1$ and $m_2$ are state quantities that are usually difficult to be measured since the product adhered from the water side and the product generated by corrosion of the structural materials cannot be distinguished.

In a related art, the model parameters are adjusted so as to allow calculated values and actual measured values of the state quantities such as C, M, and R on a left side to match, and future estimated values of $C_f$ are given as inputs and the state quantities on the left side are calculated and predicted by using the adjusted model parameters.

<Reactor Water Radioactivity Concentration Prediction Device: Overall Configuration>

Hereinafter, a reactor water radioactivity concentration prediction device for predicting a radioactivity concentration of the reactor water in the nuclear power plant P100 according to the present embodiment will be described. The reactor water radioactivity concentration prediction device predicts concentrations of cobalt 60, cobalt 58, chromium 51, manganese 54, and the like in the reactor water. Simulation and machine learning technology based on the mass balance model 140 described by Equations 1 to 8 are used in the prediction. Specifically, a result of the simulation is used as apart of the input to a machine learning model.

Figure 3:
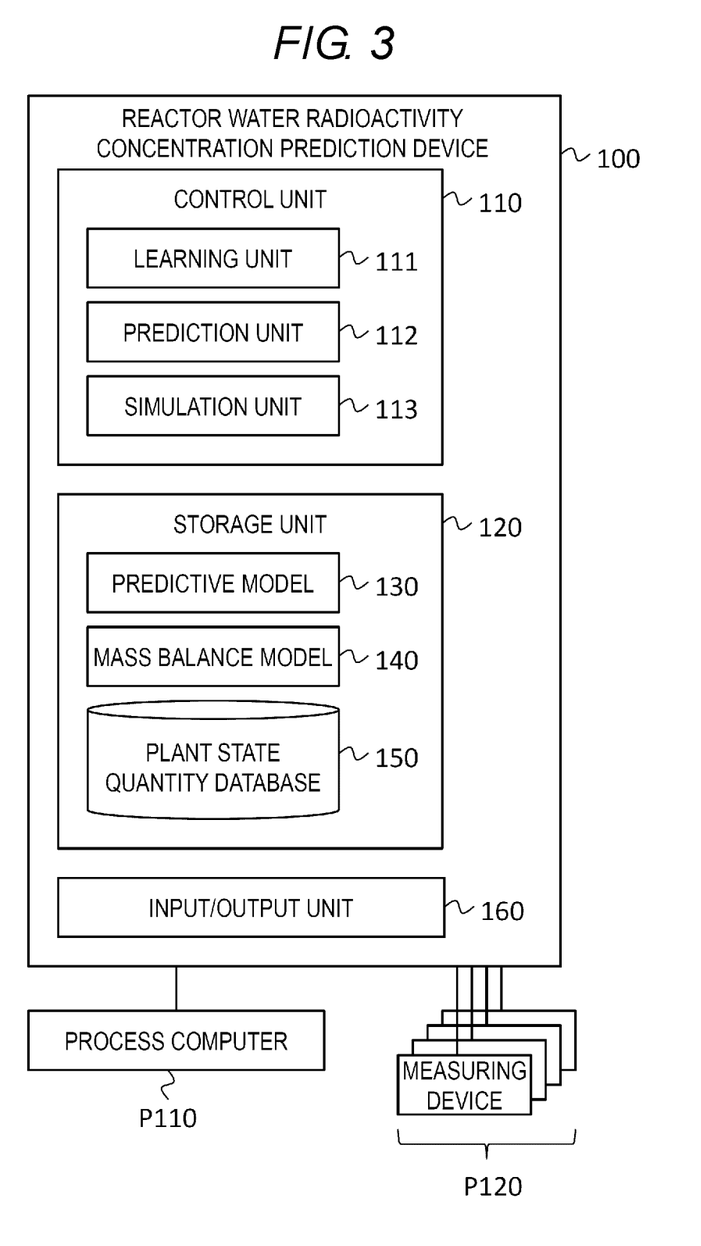
FIG. 3 is a functional configuration diagram of a reactor water radioactivity concentration prediction device according to the present embodiment.

FIG. 3 is a functional configuration diagram of a reactor water radioactivity concentration prediction device 100 according to the present embodiment. The reactor water radioactivity concentration prediction device 100 is a computer, and includes a control unit 110, a storage unit 120, and an input/output unit 160. The reactor water radioactivity concentration prediction device 100 receives operation data such as a thermal output from a process computer P110 used in the nuclear power plant P100 and output data from measuring devices P120 installed in the nuclear power plant P100.

The storage unit 120 includes a random access memory (RAM), a read only memory (ROM), a solid state drive (SSD), and the like, and stores a predictive model 130, a mass balance model 140, and a plant state quantity database 150. The predictive model 130 is a learning model of machine learning, and is, for example, a neural network. The mass balance model 140 is the simulation model described by Equations 1 to 8, and is the equations or the parameters that describe the model. Alternatively, the mass balance model 140 may be regarded as a program for executing the simulation.

The plant state quantity database 150 stores plant state quantities including plant data, feedwater data, and reactor water quality data of the nuclear power plant P100 that serve as values of the variables and parameters included in Equations 1 to 8. The plant state quantity database 150 also stores other plant state quantities such as duration of stay in reactor core of the fuel assemblies loaded in the reactor core P13 (see FIG. 1) and electrical outputs.

The input/output unit 160 receives data from the process computer P110 and the measuring devices P120 and stores the data in the plant state quantity database 150. The input/output unit 160 includes a display, a keyboard, and a mouse (not shown), receives operations from the user of the reactor water radioactivity concentration prediction device 100, and displays data such as a prediction result.

The control unit 110 is configured by a central processing unit (CPU), and includes a learning unit 111, a prediction unit 112, and a simulation unit 113. The learning unit 111 performs learning processing (see FIG. 6 described later) by using the data stored in the plant state quantity database 150 as data for supervised learning (learning data), and generates the predictive model 130 for predicting the radioactivity concentration of the reactor water. The prediction unit 112 inputs the data stored in the plant state quantity database 150 to the generated predictive model 130, and executes prediction processing (see FIG. 9 described later) for predicting the radioactivity concentration of the reactor water. The simulation unit 113 executes a simulation based on the mass balance model 140 described by Equations 1 to 8. A simulation execution result is input data of the predictive model 130. Details of processing of the learning unit 111 and the prediction unit 112 will be described later with reference to FIGS. 4 to 9.

<Data for Supervised Learning>

Figure 4:
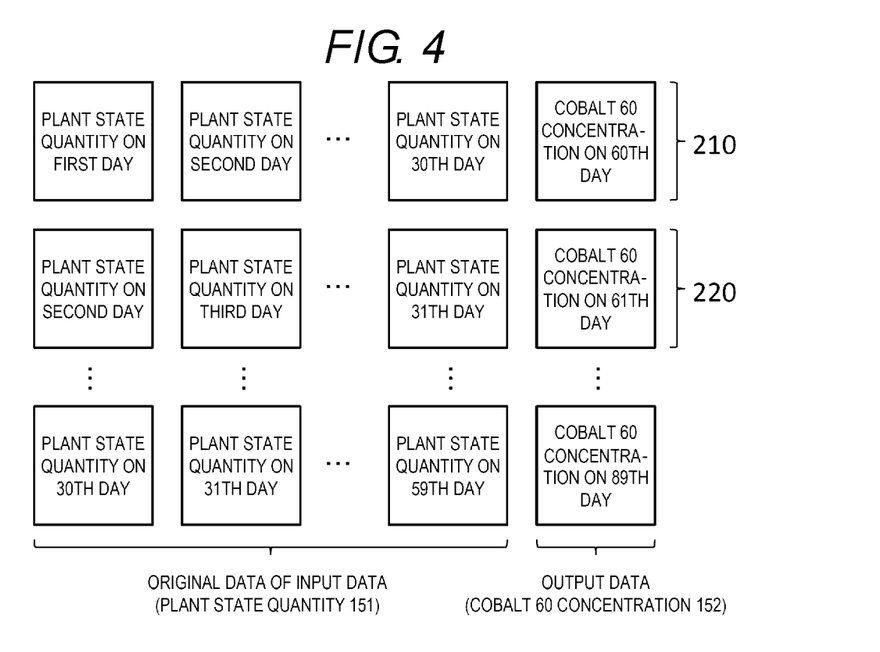
FIG. 4 is a diagram showing a configuration of original data of data for supervised learning of a predictive model in learning processing according to the present embodiment.
Figure 5:
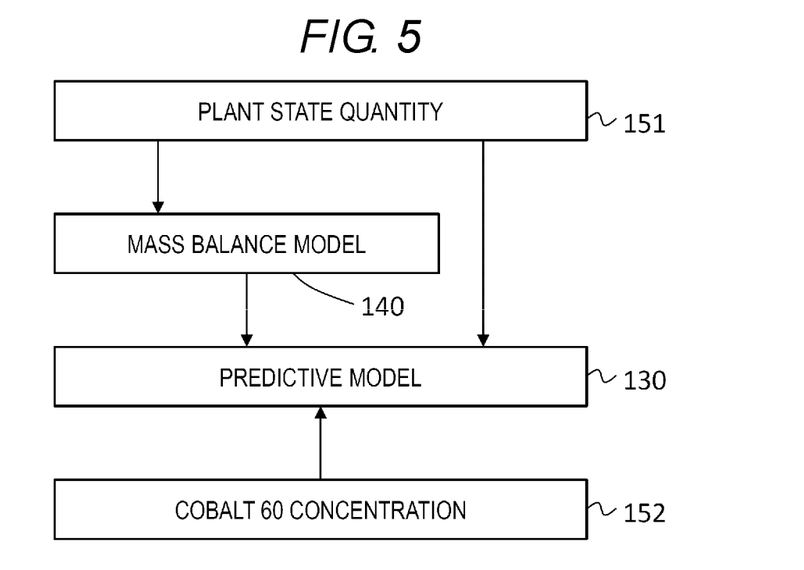
FIG. 5 is a diagram showing input data and output data of the predictive model included in the data for supervised learning according to the present embodiment.

FIG. 4 is a diagram showing a configuration of original data of the data for supervised learning of the predictive model 130 in the learning processing according to the present embodiment. FIG. 5 is a diagram showing the input data and output data of the predictive model 130 included in the data for supervised learning according to the present embodiment. Here, an example will be described, in which one set of data for supervised learning is generated from plant state quantities 151 and cobalt 60 concentrations 152 for 30 days.

A data set 210 described in FIG. 4 is an original data set of one set of data for supervised learning whose start date is the first day, and includes plant state quantities on the first day to the 30th day, and the reactor water radioactivity concentrations of cobalt 60 (also referred to as cobalt 60 concentrations) on the 60th day. The pieces of data are stored in the plant state quantity database 150.

Plant state quantities that can be actually measured (actually measured data), such as a flow rate of feedwater, a metal corrosion product concentration in feedwater, a metal corrosion product concentration in reactor water, a radioactive metal corrosion product concentration in reactor water, a flow rate of the reactor water cleanup system, duration of stay in reactor core of the fuel assembly, and an electrical output, which are included in each plant state quantity from the first day to the 30th day, are included as input data of the predictive model 130. The data for supervised learning which is input data of the predictive model 130 corresponds to an arrow from the plant state quantity 151 to the predictive model 130 shown in FIG. 5.

The amount of metal corrosion product (M) and the amount of radioactive metal corrosion product (A) accumulated on the fuel rods and calculated by using the mass balance model 140 based on the flow rate of feedwater, the metal corrosion product concentration in feedwater, the flow rate of reactor water cleanup system, the duration of stay in reactor core in the fuel assembly, and the electrical output, which are included in the plant state quantities from the first day to the 30th day, are included as the input data (also referred to as plant state quantity prediction values) of the predictive model 130. The data for supervised learning which is input data of the predictive model 130 corresponds to an arrow from the mass balance model 140 to the predictive model 130 shown in FIG. 5. Although not directly appearing in Equations 1 to 8, the flow rate of reactor water cleanup system, the duration of stay in reactor core of the fuel assembly, and the electrical output affect the variables and parameters. For example, the adhesive constant for the fuel rods ($\delta$) is dependent on the electrical output, and the removal rate ($\beta$) in the nuclear reactor cleanup system is calculated based on the flow rate of reactor water cleanup system.

The cobalt 60 concentration (actual measured value) on the 60th day is included as the output data (radioactive metal corrosion product concentration in reactor water) of the predictive model 130. The data for supervised learning which is output data of the predictive model 130 corresponds to an arrow from the cobalt 60 concentration 152 to the predictive model 130 shown in FIG. 5.

The input data and the output data described above are one set of data for supervised learning for the predictive model 130. Similarly, one set of data for supervised learning is generated from the data set 220 having the second day as the start date. By repeating the process hereinafter, 30 sets of data for supervised learning for the predictive model 130 are generated from the plant state quantities of the first day to the 59th day and the cobalt 60 concentrations from the 60th day to the 89th day.

<Reactor Water Radioactivity Concentration Prediction Device: Learning Processing>

Figure 6:
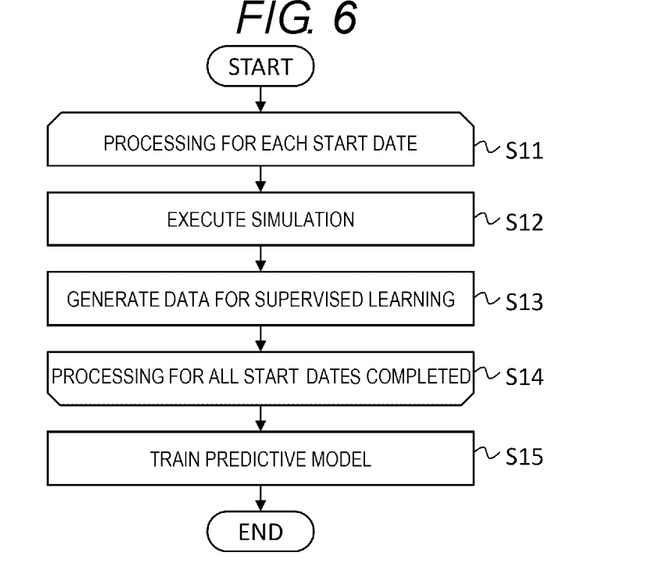
FIG. 6 is a flowchart of the learning processing to be executed by a learning unit according to the present embodiment.

FIG. 6 is a flowchart of the learning processing to be executed by the learning unit 111 according to the present embodiment.

In step S11, the learning unit 111 executes steps S12 to S13 for each predetermined start date (first day to 30th day).

In step S12, upon receiving an instruction from the learning unit 111, the simulation unit 113 sets the plant state quantity 151 as input data, and executes the simulation based on the mass balance model 140. Specifically, the simulation unit 113 calculates the amount of metal corrosion product (M) and the amount of radioactive metal corrosion product (A) accumulated on the fuel rods, based on the flow rate of feedwater, the metal corrosion product concentration in feedwater, the flow rate of reactor water cleanup system, the duration of stay in reactor core in the fuel assembly, and the electrical output which are included in the plant state quantities 151 from the start date to the 30th day by using the mass balance model 140 (Equations 1 to 8).

In step S13, the learning unit 111 generates the data for supervised learning. Specifically, the learning unit 111 generate the data for supervised learning in which the plant state quantities that can be actually measured such as the flow rate of feedwater, the metal corrosion product concentration in feedwater, the metal corrosion product concentration in reactor water, the radioactive metal corrosion product concentration in reactor water, the flow rate of reactor water cleanup system, the duration of stay in reactor core in the fuel assembly, and the electrical output which are included in the plant state quantities 151 for the 30 days and the amount of metal corrosion product and the amount of radioactive metal corrosion product accumulated on the fuel rods that are calculated in step S12 are input data, and the cobalt 60 concentration 152 after 59 days from the start date is output data.

In step S14, if the learning unit 111 executes steps S12 to S13 for every predetermined start date, the processing proceeds to step S15, and if there is an unprocessed start date, the processing returns to step S12 and the unprocessed start date is processed.

In step S15, the learning unit 111 trains the predictive model 130 using the data for supervised learning generated in step S13 (causes the predictive model 130 to learn the data for supervised learning), and constructs the predictive model 130.

The predictive model 130 for predicting the cobalt 60 concentration can be constructed by the above-described prediction processing. Next, processing of predicting the cobalt 60 concentration using the predictive model 130 will be described.

<Reactor Water Radioactivity Concentration Prediction Device: Prediction Processing>

Figure 7:
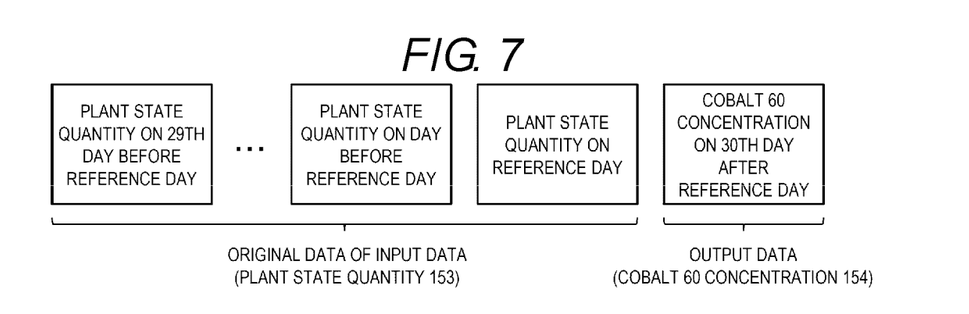
FIG. 7 is a diagram showing a configuration of original data of input data of a predictive model in prediction processing according to the present embodiment.
Figure 8:
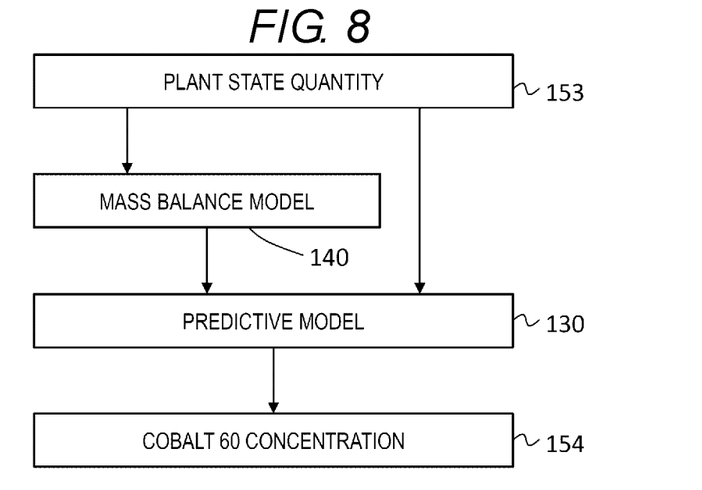
FIG. 8 is a diagram showing input data and output data of the predictive model in the prediction processing according to the present embodiment.

FIG. 7 is a diagram showing a configuration of original data of input data of the predictive model 130 in prediction processing according to the present embodiment. FIG. 8 is a diagram showing the input data and the output data of the predictive model 130 in the prediction processing according to the present embodiment.

In FIG. 7, a reference day is an execution day of the prediction processing, and the prediction unit 112 predicts the cobalt 60 concentration 30 days after the reference day based on the plant state quantities for the past 30 days including the reference day.

Specifically, plant state quantities that can be actually measured (actually measured data), such as the flow rate of feedwater, the metal corrosion product concentration in feedwater, the metal corrosion product concentration in reactor water, the radioactive metal corrosion product concentration in reactor water, the flow rate of reactor water cleanup system, the duration of stay in reactor core of the fuel assembly, and the electrical output, which are included in respective plant state quantities from the 29th day before the reference day to the reference day, are included as the input data of the predictive model 130. The input data corresponds to an arrow from a plant state quantity 153 to the predictive model 130 shown in FIG. 8.

The amount of metal corrosion product (M) and the amount of radioactive metal corrosion product (A) accumulated on the fuel rods that are calculated by using the mass balance model 140 based on the flow rate of feedwater, the metal corrosion product concentration in feedwater, the flow rate of reactor water cleanup system, the duration of stay in reactor core in the fuel assembly, and the electrical output, which are included in the plant state quantities from the 29th day before the reference day to the reference day, are included as the input data (plant state quantity prediction values) of the predictive model 130. The input data corresponds to an arrow from the mass balance model 140 to the predictive model 130 shown in FIG. 8.

The cobalt 60 concentration 30 days after the reference day is included as the output data of the predictive model 130. The output data corresponds to an arrow from the predictive model 130 to a cobalt 60 concentration 154 shown in FIG. 8.

Figure 9:
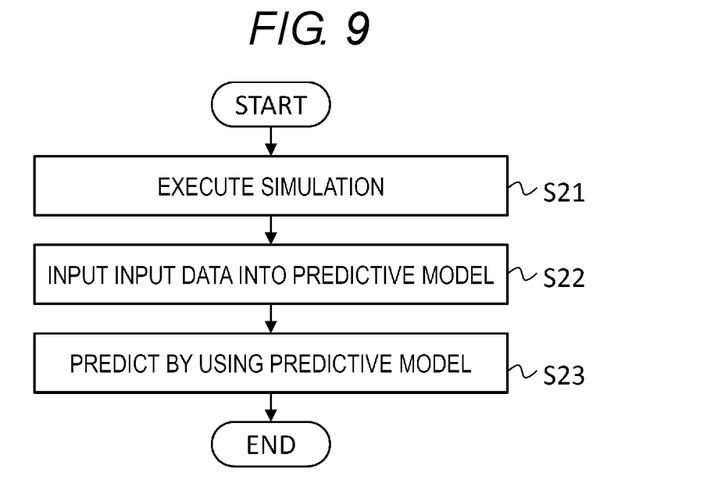
FIG. 9 is a flowchart of the prediction processing to be executed by a prediction unit according to the present embodiment.

FIG. 9 is a flowchart of the prediction processing to be executed by the prediction unit 112 according to the present embodiment.

In step S21, upon receiving an instruction from the prediction unit 112, the simulation unit 113 sets the plant state quantity 153 as input data, and executes the simulation based on the mass balance model 140. Specifically, the simulation unit 113 calculates the amount of metal corrosion product (M) and the amount of radioactive metal corrosion product (A) accumulated on the fuel rods based on the flow rate of feedwater, the metal corrosion product concentration in feedwater, the flow rate of reactor water cleanup system, the duration of stay in reactor core in the fuel assembly, and the electrical output, which are included in the plant state quantities 153 for the past 30 days including the reference day, by using the mass balance model 140 (Equations 1 to 8).

In step S22, the prediction unit 112 inputs the input data into the predictive model 130. Specifically, the prediction unit 112 inputs the plant state quantities that can be actually measured such as the flow rate of feedwater, the metal corrosion product concentration in feedwater, the metal corrosion product concentration in reactor water, the radioactive metal corrosion product concentration in reactor water, the flow rate of reactor water cleanup system, the duration of stay in reactor core in the fuel assembly, and the electrical output, which are included in the plant state quantities 153 for the past 30 days including the reference day, and the amount of metal corrosion product and the amount of radioactive metal corrosion product accumulated on the fuel rods that are calculated in step S21 into the predictive model 130.

In step S23, the prediction unit 112 predicts the cobalt 60 concentration by executing the predictive model 130 and acquiring the output of the cobalt 60 concentration 154.

When a reference point is current, the cobalt 60 concentration 154 can be predicted from the plant state quantity 153, which is a past actual value (actual measured value). When the reference point is set in the past, the prediction can be verified. Specifically, accuracy of the prediction can be evaluated by calculating the cobalt 60 concentration 154 based on the plant state quantity 153, which is the past actual value, and comparing the calculated cobalt 60 concentration 154 with the cobalt 60 concentration of an actual value. For example, the accuracy of the prediction can be evaluated by comparing the cobalt 60 concentration on the 30th day before the reference point and a cobalt 60 concentration today.

<Modification: Period of Input/Output Data to Predictive Model>

In the above-described embodiment, although the data input to the predictive model 130 (see FIGS. 5 and 8) is data of 30 days, the invention is not limited thereto, and the data may be, for example, based on plant state quantities in a longer period. Although the cobalt 60 concentration 30 days after the reference day is predicted, the cobalt 60 concentration in a farther future, for example, 90 days after the reference day, may be predicted. The number of days to be predicted is not limited to one day, and may be, for example, a period from 30 days to 60 days after the reference day. The predictive model 130 is constructed by creating the predictive model 130 in accordance with a desired period of the input data, or an interval between the reference day and a day of predicting (prediction day) the cobalt 60 concentration, and thus the cobalt 60 concentration in the desired period of the input data or an interval between the reference day and a prediction day can be predicted.

In the above-described embodiment, plant state quantities between the reference day and the prediction day are not included in the input data. The plant state quantity that is predetermined by an operation plan of the nuclear power plant or predictable may be added to the input data as a planned value.

Figure 10:
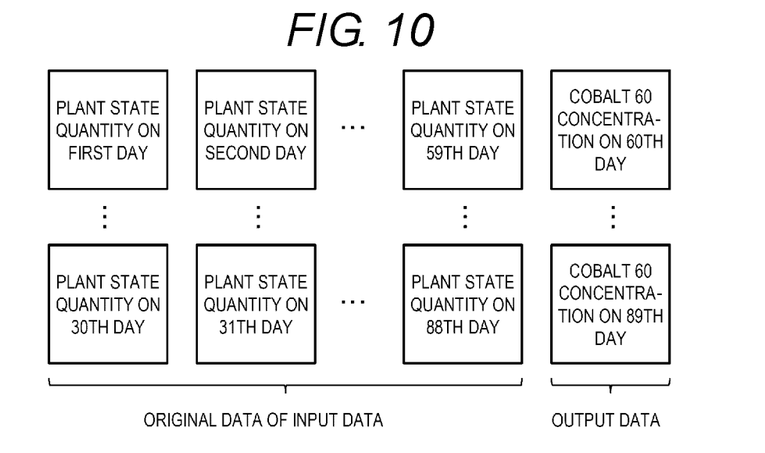
FIG. 10 is a diagram showing a configuration of original data of data for supervised learning of a predictive model in learning processing according to a modification of the present embodiment.
Figure 11:
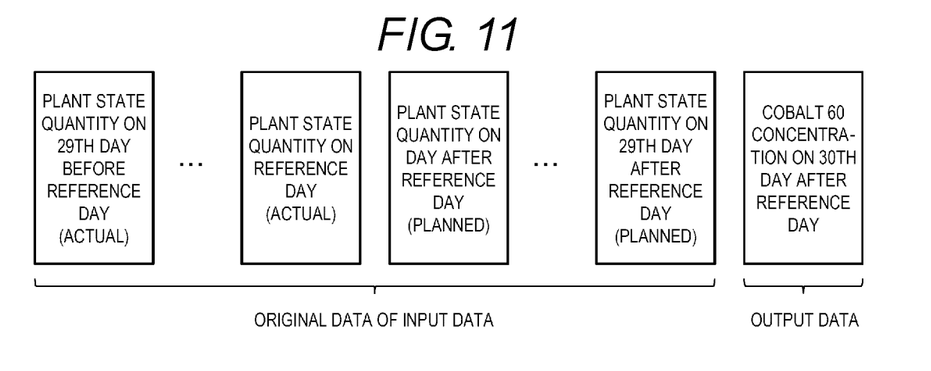
FIG. 11 is a diagram showing a configuration of original data of input data of a predictive model in prediction processing according to the modification of the present embodiment.

FIG. 10 is a diagram showing a configuration of original data of the data for supervised learning of the predictive model 130 in learning processing according to a modification of the present embodiment. FIG. 11 is a diagram showing a configuration of original data of input data of the predictive model 130 in the prediction processing according to the modification of the present embodiment. In the learning processing, plant state quantities of 29 days may be further added to the original data of the input data of the data for supervised learning in addition to the plant state quantities of 30 days from the start date (see FIG. 4). In the prediction processing, the plant state quantities, which are planned values, from the reference day to the prediction day, are used as the original data of the input data in addition to the plant state quantities of the past 30 days including the reference day (see FIG. 7).

For example, the flow rate of feedwater, the metal corrosion product concentration in feedwater, the flow rate of reactor water cleanup system, the duration of stay in reactor core in the fuel assembly, and the electrical output are determined by the operation plan (predictable) or can be adjusted by an operation of the nuclear power plant, and may be added to the input to the predictive model 130. The amount of metal corrosion product and amount of radioactive metal corrosion product accumulated on the fuel rods that can be calculated based on these plant state quantities by using the mass balance model 140 may also be added to the input to the predictive model 130. The reactor water radioactivity concentration prediction device 100 can predict the cobalt 60 concentration with higher accuracy by adding input data on days close to the prediction day.

<Design of Operation Plan Using Reactor Water Radioactivity Concentration Prediction Device>

In order to design an operation plan for inhibiting the cobalt 60 concentration to a desired value or less, the prediction processing may be executed repeatedly while changing the plant state quantity 153 (see FIG. 8) serving as a planned value. For example, an iron concentration in the feedwater exists as the plant state quantity 153. Cobalt 60 is incorporated into a metal oxide containing iron oxide as a main component on the surface of the fuel rods, and the cobalt 60 in the reactor water is eluted therefrom. Therefore, it is considered that the cobalt 60 concentration is likely to be affected by the iron concentration of the feedwater. The iron concentration in the feedwater can be adjusted, and the cobalt 60 concentration can be changed by making a plan and setting the iron concentration in the feedwater to a desired value (planned value at a predicted time point).

Figure 12:
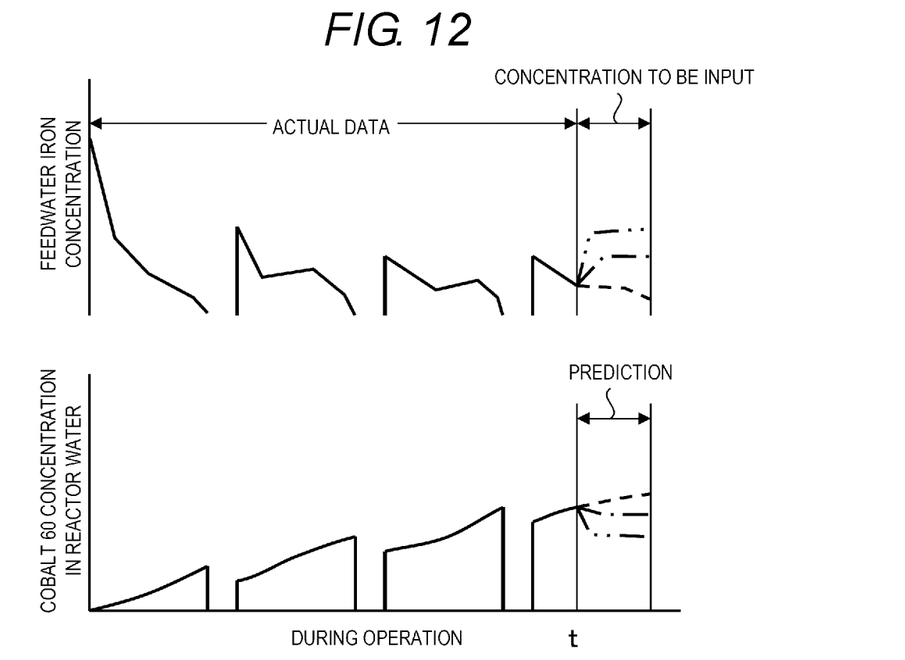
FIG. 12 is a diagram showing a change in prediction of cobalt 60 concentration data accompanying a change in plant state quantity according to the present embodiment.

FIG. 12 is a diagram showing a change in prediction of cobalt 60 concentration data accompanying a change in plant state quantity 153 according to the present embodiment. An upper graph in FIG. 12 is a graph showing the iron concentration in the feedwater included in the plant state quantity 153, data before a time point t is actual data (actually measured data), and the estimated iron concentration to be input as three planned values after the time point t is indicated by a dashed line, a one-dot chain line, and a two-dot chain line. A lower graph of FIG. 12 is a prediction result of the cobalt 60 concentration data corresponding to the plant state quantities including the feedwater iron concentration shown in the upper graph of FIG. 12. It can be seen that the cobalt 60 concentration decreases as the feedwater iron concentration increases.

Accordingly, by repeatedly executing the prediction processing while changing the plant state quantity of the planned value such as the feedwater iron concentration, the planned value of the plant state quantity for achieving the desired cobalt 60 concentration can be obtained, and the operation plan of the nuclear power plant P100 can be designed.

<Features of Learning Processing and Prediction Processing>

A generation source of cobalt 60 in the reactor water is cobalt adhered to the fuel rods, and the cobalt receives neutron irradiation from the fuel rods and is turned into cobalt 60. The cobalt 60 is incorporated into the metal oxide containing iron oxide as the main component on the surfaces of the fuel rods, and the cobalt 60 in the reactor water is eluted therefrom. Therefore, a temporal change in the cobalt 60 concentration in the reactor water is strongly affected by the amount of the metal oxide formed on the surfaces of the fuel rods. The plant state quantity is a value that cannot be measured during operation of the nuclear power plant, and can be measured after the fuel rods are taken out from the reactor core P13 (see FIG. 1) while the nuclear power plant is stopped, such as during the periodic inspection.

The input data of the predictive model 130 in the above-described embodiment includes the amount of metal corrosion product (M) and the amount of radioactive metal corrosion product (A) accumulated on the fuel rods that are calculated by using the mass balance model. As compared with a model in which only the actual value (measured value) of the plant state quantity is input, the prediction accuracy of the cobalt 60 concentration can be improved by adding the plant state quantities that cannot be measured during operation but strongly affect the cobalt 60 concentration to the input data of the predictive model 130. As compared with the prediction by the mass balance model, the prediction is performed in consideration of the correlation between the plant state quantities that are not included in the mass balance model, and the accuracy is improved.

<Modification: Prediction Processing Using a Plan Pattern>

In FIG. 12, the reactor water radioactivity concentration prediction device 100 predicts the cobalt 60 concentration by manually inputting a planned value of a reactor water iron concentration. The planned value of the reactor water iron concentration may be prepared in advance, and the cobalt 60 concentration may be predicted for each planned value, and the prediction result may be output. A pattern of the planned value is, for example, a pattern of migration to an iron concentration that is higher/lower by a predetermined value/a predetermined ratio than a current reactor water iron concentration, a pattern of a length of a period until the migration, or a pattern of a combination thereof. For example, there is a pattern that maintains the concentration after a current reactor water iron concentration is increased by 1 parts per billion (ppb, µg/l) in one day, a pattern that maintains the concentration after the current reactor water iron concentration is reduced by 20% in half a day, and a pattern that increases 0.01 ppb for each day.

Figure 13:
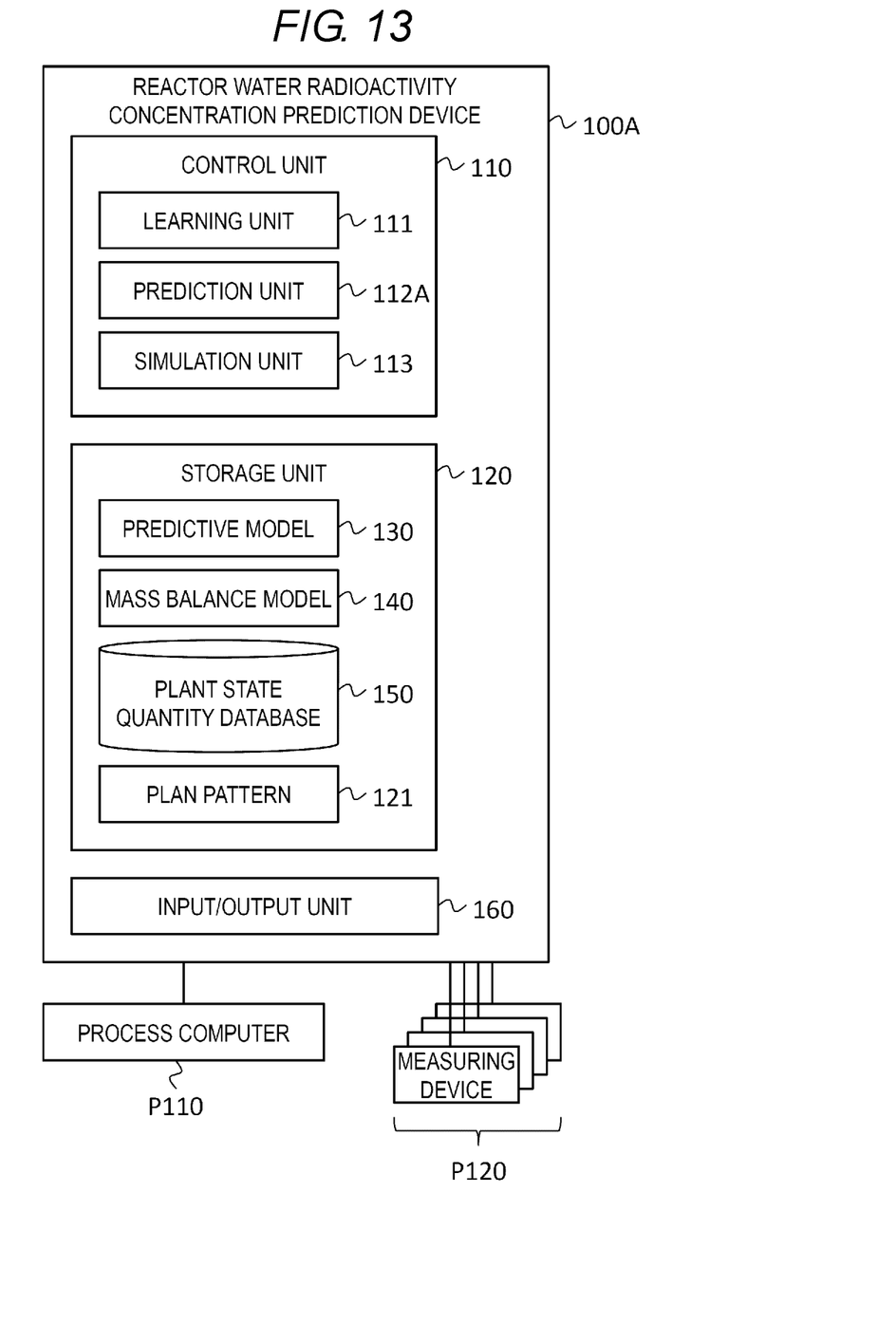
FIG. 13 is a functional configuration diagram of a reactor water radioactivity concentration prediction device according to the modification of the present embodiment.

FIG. 13 is a functional configuration diagram of a reactor water radioactivity concentration prediction device 100A according to the modification of the present embodiment. As compared with the reactor water radioactivity concentration prediction device 100 (see FIG. 3), the reactor water radioactivity concentration prediction device 100A further stores a plan pattern 121 in the storage unit 120, and includes a prediction unit 112A instead of the prediction unit 112. The plan pattern 121 is a pattern of the planned value of the iron concentration described above. The prediction unit 112A executes prediction processing by using a plan pattern described in FIG. 14 to be described later.

Figure 14:
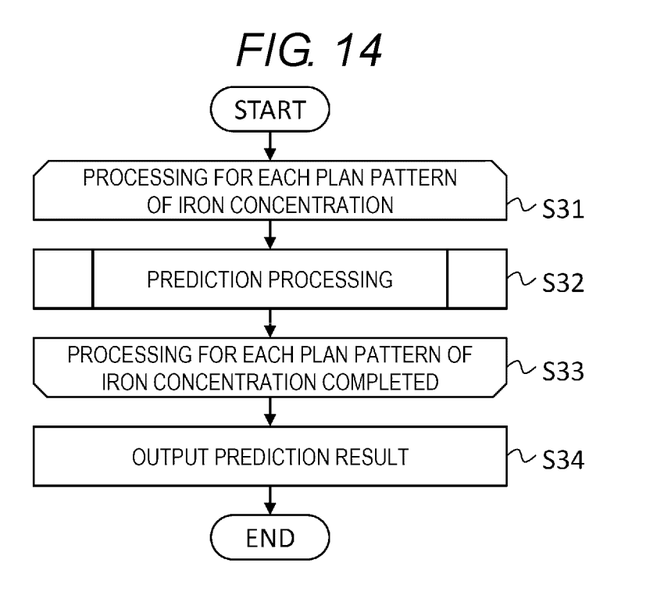
FIG. 14 is a flowchart of a prediction processing using a plan pattern according to the modification of the present embodiment.

FIG. 14 is a flowchart of the prediction processing using the plan pattern according to the modification of the present embodiment.

In step S31, the prediction unit 112A executes step S32 for each plan pattern 121 of the reactor water iron concentration.

In step S32, the prediction unit 112A executes the prediction processing (see FIG. 9) by setting the plant state quantity indicated in the plan pattern of the reactor water iron concentration as original data of the input data.

In step S33, the prediction unit 112A proceeds to step S34 when step S32 is executed for all plan patterns 121 of the reactor water iron concentration, and returns to step S32 and processes an unprocessed plan pattern if there is an unprocessed plan pattern 121 of the reactor water iron concentration.

In step S34, the prediction unit 112A outputs the result of the prediction processing of step S32 (displays the result on a display of the input/output unit 160).

According to the above-described reactor water radioactivity concentration prediction device 100A, the user (operator of the plant) of the reactor water radioactivity concentration prediction device 100A can grasp how a prediction value of the cobalt 60 concentration changes in accordance with the planned value of the reactor water iron concentration. The planned value included in the plan pattern 121 is not limited to the reactor water iron concentration, and may be another plant state quantity affecting the cobalt 60 concentration.

<Modification: Output Data of Mass Balance Model to be Input to Predictive Model>

In the embodiment described above, the input data of the predictive model 130 calculated by the mass balance model 140 is the amount of metal corrosion product (M) and the amount of radioactive metal corrosion product (A) accumulated on the fuel rods. In the reactor water activity concentration prediction device 100, a metal corrosion product concentration (C) and a radioactive metal corrosion product concentration (R) of the reactor water may be calculated by using the mass balance model 140 as input data of the predictive model 130.

Specifically, the radioactive metal corrosion product concentration (C) and the radioactive metal corrosion product concentration (R) of the reactor water calculated in step S12 of the learning processing (see FIG. 6) are added to the input data of the data for supervised learning for the predictive model 130 in step S13. The input data corresponds to the arrow from the mass balance model 140 to the predictive model 130 shown in FIG. 5.

Similarly as in the prediction processing (see FIG. 9), the metal corrosion product concentration (C) and the radioactive metal corrosion product concentration (R) of the reactor water calculated in step S21 are added to the input data for the predictive model 130 in step S22. The input data corresponds to the arrow from the mass balance model 140 to the predictive model 130 shown in FIG. 8.

The prediction accuracy of the cobalt 60 concentration of the predictive model 130 can be improved by adding the data predicted by the mass balance model 140 as the input data to the predictive model 130.

<Modification: Metal for Concentration Prediction>

In the above-described embodiment, the reactor water radioactivity concentration prediction device 100 learns and predicts the cobalt 60 concentration. In addition to the cobalt 60, the reactor water radioactivity concentration prediction device 100 can also learn and predict cobalt 58 and manganese 54 in a similar manner.

<Modification: Separation of Device that Executes Learning Processing and Prediction Processing>

The invention is not limited to the above-described embodiments, and modifications can be made without departing from the scope thereof. For example, the learning processing and the prediction processing executed by the reactor water radioactivity concentration prediction device 100 may be executed by separated devices. A predictive model construction device may execute the learning processing to construct a predictive model, and a prediction device that acquires the constructed predictive model may execute the prediction processing.

<Other Modification>

In the above-described embodiments, although data for each day is set as the input data, the invention is not limited thereto, and the input data may be, for example, data for every two days or every six hours. An interval of the input data may not be limited to a fixed interval, for example, an interval of input data that is far from the prediction day may be increased. By increasing the interval and reducing the number of the input data, the reactor water radioactivity concentration prediction device 100 can increase speeds of the learning processing and the prediction processing.

In the above-described embodiment, amass balance model is used as a model of the migration behavior of the metal corrosion product. In addition, a physical or chemical model suitable for a pressurized water nuclear power plant or another type of reactor (for example, heavy water reactor) may be used.

Although some embodiments of the invention have been described above, these embodiments are merely examples, and the technical scope of the invention is not limited thereto. The invention can be implemented in various other embodiments, and various omissions, substitutions, and changes can be made without departing from the spirit of the invention. The embodiments and modifications thereof are included in the scope and gist of the invention described in the description, and are also included in the disclosure described in the claims and equivalents thereof.

What is claimed is:

1. A predictive model construction method of a reactor water radioactivity concentration predictive model construction device that predicts a radioactive metal corrosion product concentration in reactor water of a nuclear reactor in a nuclear power plant, the predictive model construction method comprising:

the predictive model construction device executing:

a step of calculating a plant state quantity prediction value to be calculated by using a physical model that describes plant state quantities of the nuclear power plant including a flow rate of feedwater and a metal corrosion product concentration in feedwater of the reactor water in the nuclear reactor; and a step of causing a machine learning model to learn learning data for supervised learning so as to construct a predictive model, the learning data for supervised learning including the plant state quantity prediction value and a plant state quantity that is able to be actually measured and includes at least one of the flow rate of feedwater, the metal corrosion product concentration in feedwater, a metal corrosion product concentration in reactor water, a radioactive metal corrosion product concentration in reactor water, a flow rate of reactor water cleanup system, duration of stay in reactor core in a fuel assembly, and electrical output of the nuclear reactor as input data, and including a radioactive metal corrosion product concentration in the reactor water as output data, wherein the radioactive metal corrosion product is an actual measured value, and a step of using the predictive model to predict radioactive corrosion product concentration on nuclear power plant structures and lower an exposure dose of work personnel during periodic inspection of the structures, wherein the physical model is a mass balance model that uses the flow rate of feedwater and the metal corrosion product concentration in feedwater of the reactor water of the nuclear reactor and is related to a migration behavior of a metal corrosion product and a radioactive metal corrosion product in the reactor water, and the plant state quantity prediction value includes at least one of an amount of metal corrosion product and an amount of radioactive metal corrosion product accumulated on a fuel rod of the nuclear reactor, the amount of metal corrosion product and the amount of radioactive metal corrosion product being calculated by using the mass balance model.

2. The predictive model construction method according to claim 1, wherein the plant state quantity prediction value further includes at least one of a metal corrosion product concentration and a radioactive metal corrosion product concentration in the reactor water of the nuclear reactor, the metal corrosion product concentration and the radioactive metal corrosion product concentration being calculated by using the mass balance model.

3. The predictive model construction method according to claim 1, wherein the radioactive metal corrosion product concentration in reactor water is a radioactive metal corrosion product concentration in reactor water of any of cobalt 60, cobalt 58, and manganese 54.

4. A prediction method of a reactor water radioactivity concentration prediction device that predicts a radioactive metal corrosion product concentration in reactor water of a nuclear reactor in a nuclear power plant, the prediction device stores a predictive model that is obtained by causing a machine learning model to learn learning data for supervised learning, the learning data for supervised learning including a plant state quantity that is able to be actually measured and includes at least one of a flow rate of feedwater, a metal corrosion product concentration in feedwater, a metal corrosion product concentration in reactor water, a radioactive metal corrosion product concentration in reactor water, a flow rate of reactor water cleanup system, duration of stay in reactor core in a fuel assembly, and electrical output of the nuclear reactor and a plant state quantity prediction value calculated by using a physical model that describes plant state quantities of the nuclear power plant including the flow rate of feedwater and the metal corrosion product concentration in feedwater of the reactor water in the nuclear reactor as input data and including a radioactive metal corrosion product concentration in the reactor water as output data, wherein the radioactive metal corrosion product concentration is an actual measured value, the prediction method comprising:

the prediction device executing:

a step of calculating the plant state quantity prediction value based on the plant state quantities by using the physical model;

a step of inputting the calculated plant state quantity prediction value and a plant state quantity that includes at least one of the flow rate of feedwater, the metal corrosion product concentration in feedwater, the metal corrosion product concentration in reactor water, the radioactive metal corrosion product concentration in reactor water, the flow rate of reactor water cleanup system, the duration of stay in reactor core in the fuel assembly, and the electrical output of the nuclear reactor into the predictive model as input data and calculating a radioactive metal corrosion product concentration in the reactor water as output data; and a step of using the predictive model to predict radioactive corrosion product concentration on nuclear power plant structures and lower an exposure dose of work personnel during periodic inspection of the structures, wherein the plant state quantity to be input to the predictive model is actually measured data at an input time point, and the plant state quantity to be input to the predictive model further includes a planned value from the input time point to a predicted time point of the radioactive metal corrosion product concentration in reactor water.

5. The prediction method according to claim 4, wherein the prediction device stores a plan pattern of a planned value of a plant state quantity from the input time point to the predicted time point of the radioactive metal corrosion product concentration in reactor water, and the plant state quantity to be input to the predictive model further includes a planned value of the plan pattern from the input time point to the predicted time point of the radioactive metal corrosion product concentration in reactor water.

6. The prediction method according to claim 1, wherein the radioactive metal corrosion product concentration in reactor water is a radioactive metal corrosion product concentration in reactor water of any of cobalt 60, cobalt 58, and manganese 54.

7. A prediction method of a reactor water radioactivity concentration prediction device that predicts a radioactive metal corrosion product concentration in reactor water of a nuclear reactor in a nuclear power plant, the prediction device stores a predictive model that is obtained by causing a machine learning model to learn learning data for supervised learning, the learning data for supervised learning including a plant state quantity that is able to be actually measured and includes at least one of a flow rate of feedwater, a metal corrosion product concentration in feedwater, a metal corrosion product concentration in reactor water, a radioactive metal corrosion product concentration in reactor water, a flow rate of reactor water cleanup system, duration of stay in reactor core in a fuel assembly, and electrical output of the nuclear reactor and a plant state quantity prediction value calculated by using a physical model that describes plant state quantities of the nuclear power plant including the flow rate of feedwater and the metal corrosion product concentration in feedwater of the reactor water in the nuclear reactor as input data and including a radioactive metal corrosion product concentration in the reactor water as output data, wherein the radioactive metal corrosion product concentration is an actual measured value, the prediction method comprising:

the prediction device executing:

a step of calculating the plant state quantity prediction value based on the plant state quantities by using the physical model;

a step of inputting the calculated plant state quantity prediction value and a plant state quantity that includes at least one of the flow rate of feedwater, the metal corrosion product concentration in feedwater, the metal corrosion product concentration in reactor water, the radioactive metal corrosion product concentration in reactor water, the flow rate of reactor water cleanup system, the duration of stay in reactor core in the fuel assembly, and the electrical output of the nuclear reactor into the predictive model as input data and calculating a radioactive metal corrosion product concentration in the reactor water as output data; and a step of using the predictive model to predict radioactive corrosion product concentration on nuclear power plant structures and lower an exposure dose of work personnel during periodic inspection of the structures, wherein the physical model is a mass balance model that uses the flow rate of feedwater and the metal corrosion product concentration in feedwater of the reactor water of the nuclear reactor and is related to a migration behavior of a metal corrosion product and a radioactive metal corrosion product in the reactor water, and the plant state quantity prediction value includes at least one of an amount of metal corrosion product and an amount of radioactive metal corrosion product accumulated on a fuel rod of the nuclear reactor, the amount of metal corrosion product and the amount of radioactive metal corrosion product being calculated by using the mass balance model.

8. The prediction method according to claim 7, wherein the plant state quantity prediction value further includes at least one of a metal corrosion product concentration and a radioactive metal corrosion product concentration in the reactor water of the nuclear reactor, the metal corrosion product concentration and the radioactive metal corrosion product concentration being calculated by using the mass balance model.

* * * * *